(No Model.)

N. WETZEL.
MOWER.

No. 577,091. Patented Feb. 16, 1897.

Witnesses.
R. G. Schaeffer
A. M. Bunn

Inventor.
Nathan Wetzel
by U. W. Sues.
Atty.

UNITED STATES PATENT OFFICE.

NATHAN WETZEL, OF OMAHA, NEBRASKA.

MOWER.

SPECIFICATION forming part of Letters Patent No. 577,091, dated February 16, 1897.

Application filed November 7, 1895. Serial No. 568,241. (No model.)

*To all whom it may concern:*

Be it known that I, NATHAN WETZEL, residing at Omaha, in the county of Douglas and State of Nebraska, have invented certain useful Improvements in Mowers; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in mowers, and comprises an actuating mechanism to receive the cutter-bar.

The device is adapted to be used in connection with any mower in which a horizontal reciprocating cutter-bar is employed.

Figure 2:
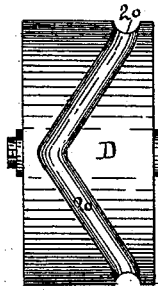
Figure 3:
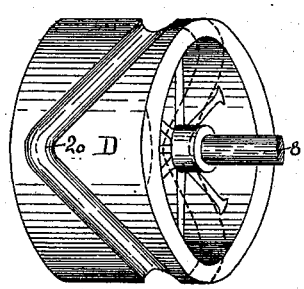
Figure 1:
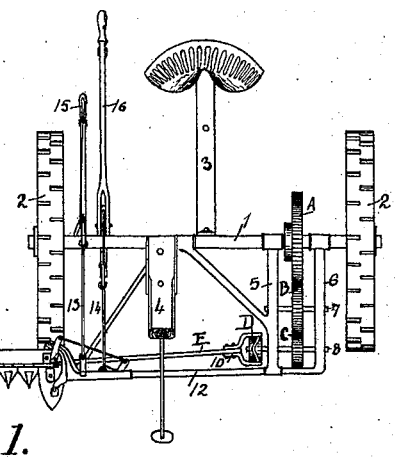
Figure 4:
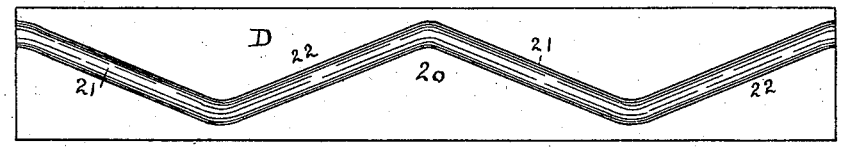
Figure 5:
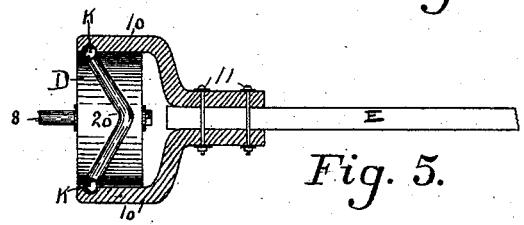
Figure 6:
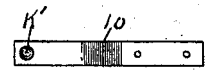

In the accompanying drawings, Figure 1 shows a front view of an ordinary mower provided with my improved reciprocating mechanism. Fig. 2 shows a front view of the actuating-roll. Fig. 3 shows a perspective thereof. Fig. 4 is an elongation of the roll, showing the groove. Fig. 5 is a central sectional view of my improvement, showing the ball in position. Fig. 6 shows a bottom view of one of the retaining-straps locating the position of the antifriction-ball.

The object of my invention is to simplify the construction of mowers as usually constructed.

In furthering the aim of my invention I provide an ordinary mower, as is shown in Fig. 1, which comprises the usual axle 1 and supporting-wheel 2, with a downwardly-extending brace 5 and a downwardly-extending brace 6, which are connected to the usual strap-bar 12.

Mounted upon the main axle and revolved thereby is an ordinary gear-wheel A, which meshes with an intermediate gear B, mounted upon the shaft 7, which shaft is given support by the bars 5 and 6, the gear B finally meshing with the gear C, mounted upon the shaft 8, which shaft gives a further support to the actuating-roll D, which is of a suitable size and material, and by means of which the cutter-bar H is actuated. This actuating-roll is provided with a zigzag groove or ball-race 20, preferably comprising the grooves 22 22, extending in like directions, and the grooves 21 21, extending in an opposite direction, said grooves being united and forming a continuous path, as shown in Fig. 4.

E represents the bar which is secured to the cutter-bar H, and which bar E is provided with two strap-bars or holders 10 10, which are adapted to snugly work over the actuating-roll D, as is shown in Figs. 1 and 5. These bars or holders 10 are provided in front with the semicircular seating K', within which the ball K is adapted to find a seating. These straps or holders 10 10 are at opposite points and hold the antifriction-ball K, so that as the main driving-wheels of the mower (referring now to Fig. 1) are actuated the grooves A, B, and C are rotated, as is also the actuating-roll D. As this roll revolves the bar E, which is held stationary, is given a uniform reciprocating rectilinear movement. This movement is of course imparted to the cutter-bar H, as is usual. By means of the employment of this roll D, I greatly simplify the construction of the machine, and this arrangement further obviates the use of the bevel-gears usually employed, and, further, it reduces the speed of the gearing as ordinarily employed, in that the cutter-bar is given two movements for every revolution of the roll D. The rolls, it is of course understood, being diametrical, are always immediately opposite one another, and consequently pass in the same direction.

The rolls are ready of access and the device is cheap of construction and can be readily replaced.

I am well aware that it is not new, broadly, to provide an actuating mechanism to receive the cutter-bar, as is shown in Patent No. 405,676, issued June 18, 1889; but What I do claim as new, and desire to secure by United States Letters Patent, is—

In a mowing-machine the combination with a suitable driving mechanism of a roll, D, provided with a ball-race within the peripheral surface of said roll, holders, 10, 10, a bar, E, supported by said holders, 10, said holders being provided with suitable ball-sockets, K' and the balls, 20, 20, working within said sockets and ball-race substantially as shown.

In testimony whereof I affix my signature in presence of two witnesses.

NATHAN WETZEL.

Witnesses:
CHARLES L. THOMAS,
GEO. W. SUES.